(12) United States Patent
Walker

(10) Patent No.: US 11,086,354 B1
(45) Date of Patent: Aug. 10, 2021

(54) AUTOMATED RETRACTABLE INFORMATION DISPLAY DEVICE

(71) Applicant: Roger E. Walker, Savannah, GA (US)

(72) Inventor: Roger E. Walker, Savannah, GA (US)

( * ) Notice: Subject to any disclaimer, the term of this patent is extended or adjusted under 35 U.S.C. 154(b) by 231 days.

(21) Appl. No.: 16/239,741

(22) Filed: Jan. 4, 2019

(51) Int. Cl.
*G06F 1/16* (2006.01)

(52) U.S. Cl.
CPC .................................. *G06F 1/1601* (2013.01)

(58) Field of Classification Search
CPC ......... B60R 11/0235; B60R 2011/0082; B60R 2300/50; B60K 35/00; B60K 2370/52; G06F 1/1601
USPC .......................................................... 348/837
See application file for complete search history.

(56) References Cited

U.S. PATENT DOCUMENTS

| | | | |
|---|---|---|---|
| 4,827,646 A | 5/1989 | Miller et al. | |
| 5,255,162 A * | 10/1993 | Kawamoto | H03J 1/044 349/65 |
| 6,913,238 B2 * | 7/2005 | Bakker | A47B 21/0314 248/460 |
| 9,661,906 B2 * | 5/2017 | Diebel | A45C 13/005 |
| 2007/0235484 A1 * | 10/2007 | Staniszewski | B60R 11/00 224/312 |
| 2007/0289184 A1 * | 12/2007 | Cheng | G09F 1/04 40/617 |
| 2012/0268665 A1 * | 10/2012 | Yetukuri | B60K 35/00 348/837 |
| 2016/0163133 A1 * | 6/2016 | Ricci | H04W 4/21 701/33.4 |
| 2017/0196328 A1 * | 7/2017 | Rogers | G06F 1/1626 |

* cited by examiner

*Primary Examiner* — Helen Shibru
(74) *Attorney, Agent, or Firm* — Sanchelima & Associates, P.A.; Christian Sanchelima; Jesus Sanchelima

(57) ABSTRACT

The present invention is disclosing an automated retractable information display device for vehicles. Display device may be configured to mount detachably at interior or exterior of vehicles. Display device may comprise a housing configured to receive information associated with a first user for viewing thereof from exterior of vehicle upon a request from a second user, a transceiver configured to receive an actuation command from a control element via a communication network, and an actuating element configured to retract in and extend out information automatically based on received actuation command.

6 Claims, 4 Drawing Sheets

AUTOMATED RETRACTABLE INFORMATION DISPLAY DEVICE

BACKGROUND OF THE INVENTION

1. Field of the Invention

The present disclosure relates to information display devices. More particularly, the present disclosure relates to an automated retractable information display device mounted at interior or exterior of vehicles.

2. Description of the Related Art

A variety of information display devices are incorporated in vehicles. Such information display devices are of a great assistance to the drivers to hold the documents thereof in an organized manner.

Several designs of information display devices have been presented in the past. None of them, however, presents automated retractable driver information display controlled by a user.

Applicant believes that a related reference corresponds to U.S. Pat. No. 4,827,646 filed by Miller that discloses assign display device for use in vehicles such as automobiles including a variable height sign holder extendible mounted on a housing or frame which has an attachment means for holding the display device on a vehicle door or similar structure. The variable height sign holder is a manually extendible structure preferably comprising a series of pairs of lever arms pivotally fastened together in the center on the ends to adjacent pairs so as to form a scissors action structure. An actuation handle is mounted on one end of the pairs of lever arms to move the ends closer together and extend the sign holder. A sign or card holder frame is positioned on an upper end of the pairs of lever arms for holding the signs to be displayed by, or stored in, the display device. However, retractability of such a device is controlled manually not automatically. In addition, the device is unable to measure and record vital health information of the driver.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide an automated retractable information display device for vehicles. Automated retractable information display device may be configured to mount detachably at interior or exterior of vehicles. Automated retractable information display device may comprise housing configured to receive information associated with a first user for viewing thereof from exterior of a vehicle upon a request from a second user. A transceiver may be configured to receive an actuation command from a control element via a communication network. An actuating element may be configured to retract in and extend out said information automatically based on said received actuation command.

Automated retractable information display device may further comprise a set of fastening members configured to mount said display device detachably on said vehicle, a flap configured to open and close for inserting said information in said housing, another housing portion having a support area in a slot therein, configured to support said extended out information, and at least one sensor configured to detect grasping on said control element within a defined proximity distance of said display device.

In accordance with an embodiment, communication network may be one of a long-distance communication network or a short-distance communication network. Automated retractable information display device may further comprise a rechargeable battery configured to supply power to actuating element, transceiver, and at least one sensor(s). Information may include information associated with first user and/or vehicle.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
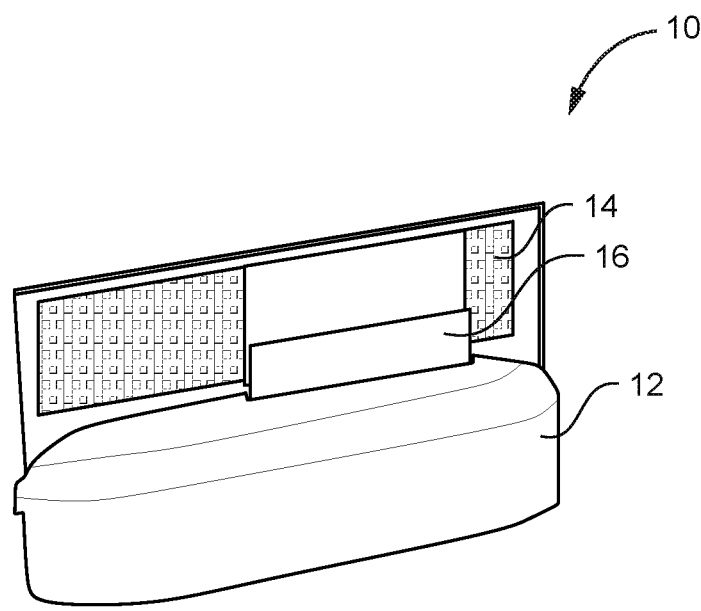
FIG. 1 represents an automated retractable display device 10 in a closed configuration and FIG. 1A represents automated retractable display device 10 in an open configuration, according to an embodiment described herein.

Referring now to the drawings, FIGS. 1-4, where the present invention is generally referred to with numeral 10, it can be observed that an automated retractable display device, in accordance with many embodiments, is provided that includes various components, a described hereinafter.

Figure 1A:
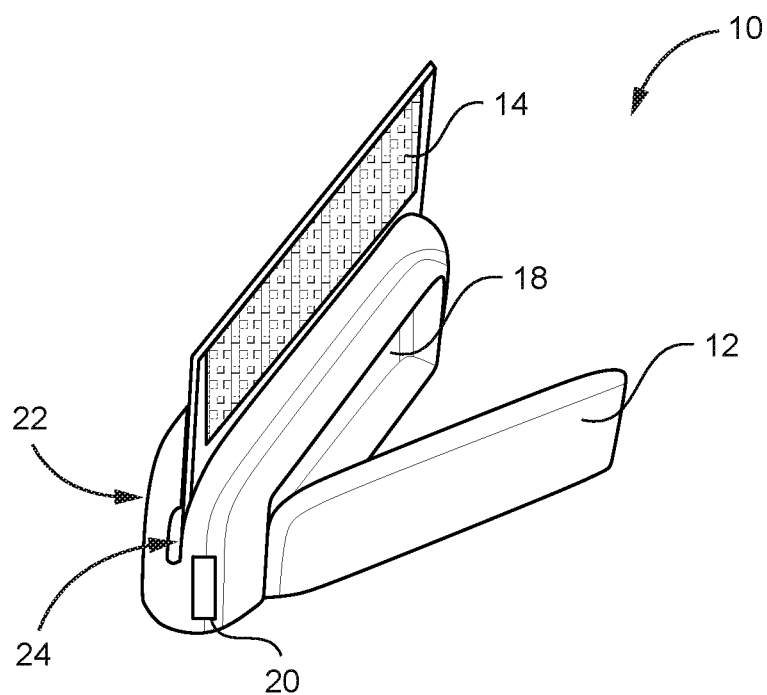
Figure 2:
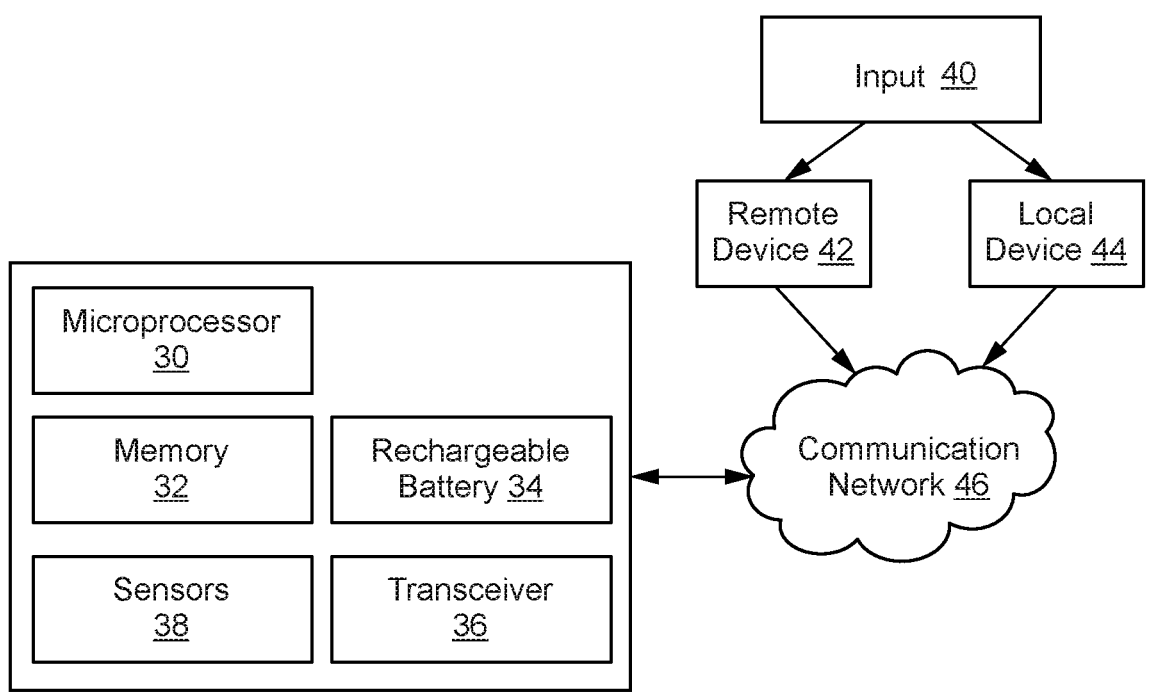
FIG. 2 represents a block diagram of automated retractable display device 10 of present invention, according to an embodiment described herein.
Figure 3:
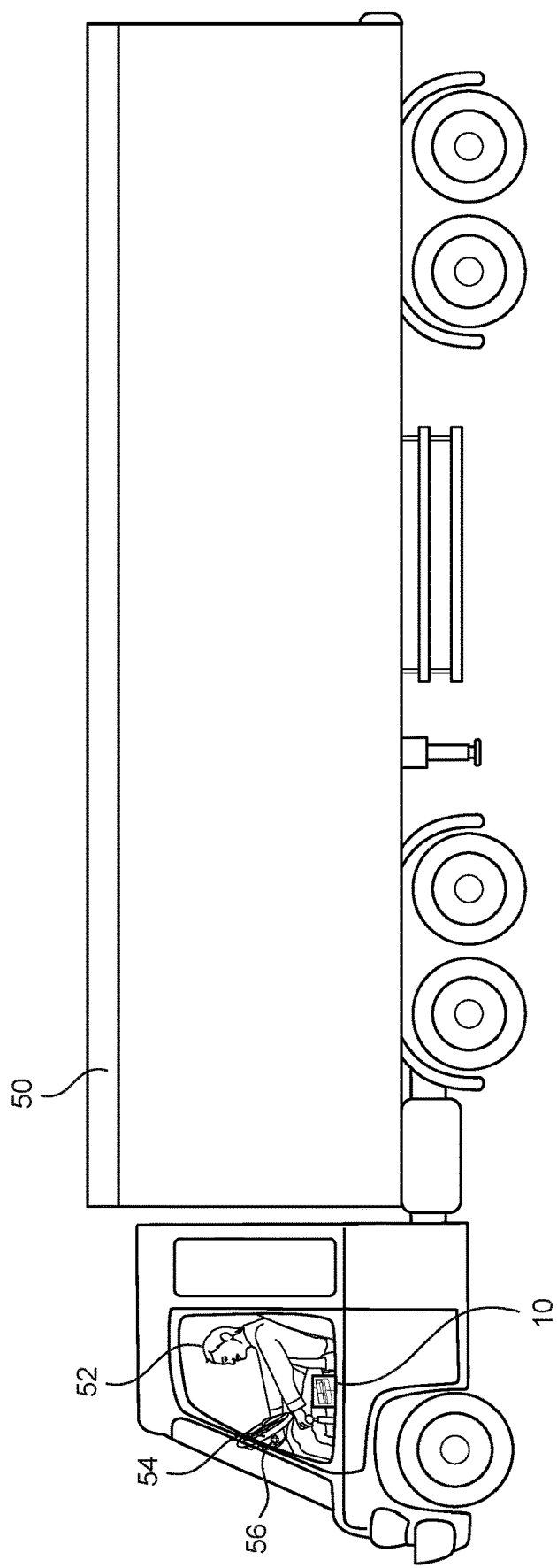
FIG. 3 represents automated retractable display device 10 of present invention in its operating environment, according to an embodiment described herein.

FIGS. 1 and 1A represent an automated retractable display device 10 of present invention in closed and open configurations thereof respectively. FIG. 2 represents a block diagram of automated retractable display device 10 of present invention. FIG. 3 represents automated retractable display device 10 of present invention in an operating environment, according to an embodiment described herein.

Referring to FIGS. 1-3, there are shown an automated retractable display device 10, a flap 12, a support area 14, an information display area 16, a housing 18, an actuating element 20, another housing portion 22, a slot 24, a microprocessor 30, a memory 32, a rechargeable battery 34, a transceiver 36, sensors 38, an input 40 received from first user, a remote device 42, a local device 44, a communication network 46, a vehicle 50, a driver 52, a steering wheel 54, and a control element 56.

Automated retractable display device 10 may be configured to mount detachably on interior or exterior of vehicle 50. In an embodiment, automated retractable display device 10 may be configured to mount on a widow of vehicle 50. In other embodiments, automated retractable display device 10 may be configured to mount on a dashboard or on a window glass, windshield glass, and so on, of vehicle 50.

Automated retractable display device 10 may be a portable device which may be removed from vehicle 50 for various purposes, such as patrolling, repair, and so on. Automated retractable display device 10 may be mounted at interior or exterior of vehicle 50 through a set of fastening members (not shown here) which may be affixed on windshield glass or window glass through suction. Accordingly, when mounted on interior of vehicle 50, automated retractable display device 10 may be directly operated by first user, such as driver 52. Alternatively, when mounted on exterior of vehicle 50, automated retractable display device 10 may be directly operated by second user, such as Traffic Police Officer. In accordance with other embodiments, automated retractable display device 10 may slide into or affix onto a slot of vehicle door through which window is raised and lowered therefrom. In some embodiments, automated retractable display device 10 may slide or pop upward to side window opening of driver's door when actuated by actuating element 20.

Automated retractable display device 10 may include a flap 12 which may be configured to move to open and close housing 18. In open configuration, housing 18 may be configured to receive plurality of information associated with either driver or vehicle or both. For example, information may include driver's license, health insurance, identity card, photo, vehicle's registration, vehicle's insurance, vehicle's servicing, and so on. Housing 18 may be sized enough to accommodate information printed on different shapes and sizes of paper media.

Automated retractable display device 10 may include actuating element 20 which may be configured to extend information display area 16 out and retract inward automatically through housing 18. Actuating element 20 may be any actuating member which is well known in art, for example, spring, and so on. Actuating element 20 may be configured to perform its action of raising and lowering information display area 16 upon receiving an actuation command provided by driver 52. Actuation command may be provided through control element 56, for example a button on local device 44, such as steering wheel 54. Actuation command may be provided via a wireless or wired communication network 46. In various examples, actuation command may be provided through wireless networks, such as Bluetooth, 2G, 3G, 4G, Zigbee, and so on. In other examples, actuation command may be provided through remote device 42, such as an app on a mobile device of first user, such as driver 52.

Automated retractable display device 10 may further include another housing portion 22 defined on back side of housing 18. Between housing 18 and other housing portion 22 may include a slot 24 running along a longitudinal dimension of housings 18 and 22. Slot 24 may be configured to receive a support area 14 to ensure information display area 16 remaining intact in 'extending out' position.

Referring to FIG. 2, automated retractable display device 10 may comprise microprocessor 30 to perform analysis of signals generated by sensors 38, actuation command received by transceiver 36, and action of actuating element 20. Microprocessor 30 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a graphics processor unit (GPU), a coprocessor, and/or other processors or integrated circuits.

Memory 32 may be configured to temporarily store various data, such as health information of user, incidences of checking and viewing information display area 16 of first user, and so on.

Rechargeable battery 34 configured to supply power to various electronic components of automated retractable display device 10. In an embodiment, rechargeable battery 34 may be charged from an external power supply via a power cable (not shown) when power level drops below a threshold power level. In an embodiment, rechargeable battery 34 may be lithium-ion batteries that are small, durable, and having long life.

Transceiver 36 may be configured to receive actuation command from remote device 42, or local device 44 via communication network 46. Communication network 46 may be one of a long-distance communication network or a short-distance communication network.

Sensors 38 may be further configured to detect touch gesture of hands of first user, such as driver 52, on control element 56 and record vital health information, such as blood sugar, heartbeat, drug intoxication, drug overdose, alcohol intake levels, blood pressure, and so on, of first user. Recorded health information may be sent by microprocessor 30 to memory 32 of automated retractable display device 10.

Input 40 received from first user, such as driver 52, may correspond to an input provided at remote device 42 or local device 44 via a control element 56 for example, a control button.

Automated retractable display device 10 may include a screen (not shown) on flap 12 or outer of other housing portion 22. Screen may be configured to display recorded health information of first user. In some embodiments, screen may be configured to display list of information display area 16 stacked in housing 18.

Figure 4:
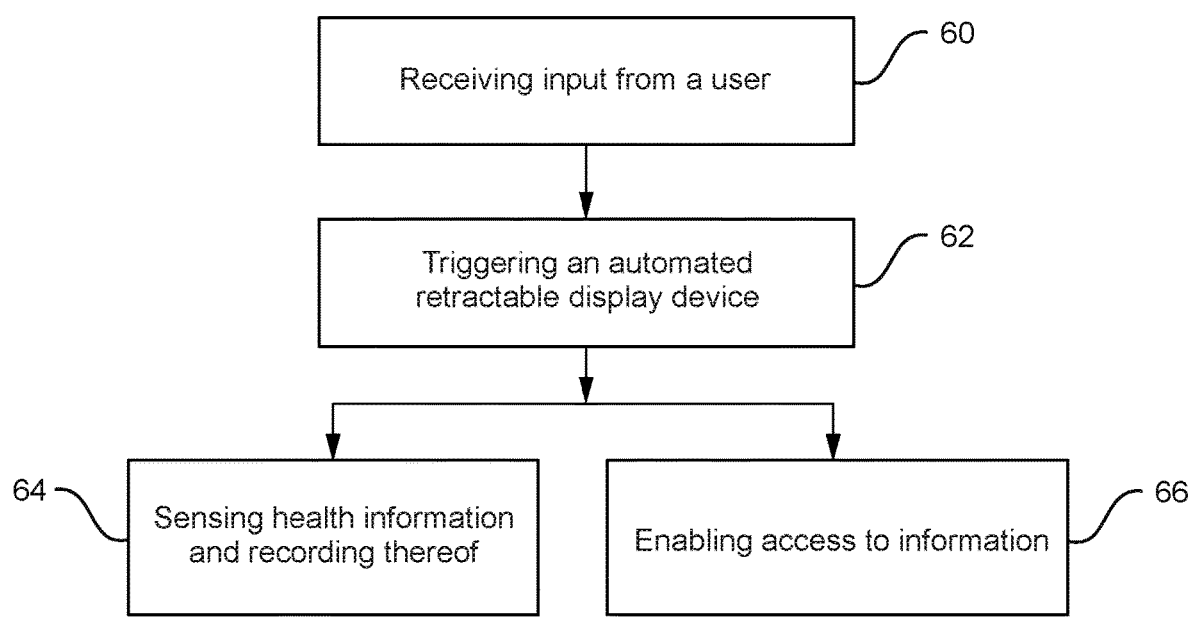
FIG. 4 represents a flowchart depicting a method for displaying driver's information in automated retractable display device 10 of present invention, according to another embodiment described herein.

Referring to FIG. 4, a method for automatically displaying information on automated retractable display device 10 may include a number of steps sequence of which may be described herein may be exemplary for sake of understanding present invention.

At 60, input 40 may be received from user. In an embodiment, input 40 may be received from first user, such as driver 52. In another embodiment, input 40 may be received from second user, such as Traffic Police Officer. Input 40 may correspond to an input provided at remote device 42 or local device 44 via a control element 56, such as a button on steering wheel 54.

At 62, automated retractable display device 10 may be triggered. In an embodiment, automated retractable display device 10 may be triggered in response to input 40 provided at remote device 42 or local device 44. Transceiver 36 receives input 40, as actuation command, which is processed by microprocessor 30.

At 64, sensors 38 may receive input from transceiver 36 to record vital health information of first user, which is further processed and sent to memory 32. In an embodiment, such vital health information may be transmitted to associated users, such as a medical practitioner, associated with first user.

At 66, access to information may be enabled. In an embodiment, actuating element 20 may be configured to extend out information display area 16 automatically based on actuation command. In an embodiment, information may be displayed in extended information display area 16. In another embodiment, automated retractable display device 10 may be on a portable CD/DVD player so that information, such as picture of driver, license, insurance, and firearm license, may be rendered as a video brochure. In yet another embodiment, automated retractable display device 10 may be arranged in such a manner that it pops up by door of driver 52, via an actuation of actuation element 20.

In an embodiment, first user may again provide another input to retract information display area 16. Such input may be processed by microprocessor 30 to retract information display area 16 based on other input provided through control element 56.

In an exemplary embodiment, a Traffic Police Officer may stop vehicle 50 for checking license of driver 52. In response, driver 52 may simply press a button located on steering wheel 54 thereby providing an actuation command to automated retractable display device 10, keeping both hands still on steering wheel 54. Automated retractable display device 10, upon receiving actuation command, may be configured to extend out license of driver 52. In an embodiment, Traffic Police Officer may check license and verify it, thereby allowing driver 52 to leave. Driver 52 may again press button to retract license in automated retractable display device 10. In another embodiment, Traffic Police Officer may remove automated retractable display device 10 and carry it to patrolling police car for further checking, thereby saving time and money. Thus, a present invention avoids a situation where driver 52 may try to take out required information document from his wallet leading Traffic Police Officer to think that driver 52 is going to attack them. In defense, Traffic Police Office, not knowing what driver 52 is trying to reach out for, may attack driver 52, causing a danger to life of driver due to misunderstanding.

Automated retractable display device 10 may provide various advantages, such as holding driver's and vehicle's information in an organized manner for easy viewing by a police officer at any point in time. Automated retractable display device 10 allows a driver to remain still, attentive and with both hands visible on steering wheel. Automated retractable display device 10 is configured to prevent need for a driver to reach around inside a purse or glove compartment to retrieve paperwork. Automated retractable display device 10 also puts a police officer's mind at ease when approaching a vehicle. Officer may simple retrieve automated retractable display device 10 and walks it back to patrol car. Automated retractable display device 10 may be helpful in case of emergency such as accidents or heart attacks as a doctor may view health information displayed on automated retractable display device 10.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An automated retractable information display device, said automated retractable information display device comprising:
a housing, said housing including a first portion and a second portion, said housing is removably mounted to a vehicle exterior, said housing includes a flap member hingedly mounted to said first portion at a lateral side thereof, said flap member extending horizontally and partially along a length of said housing, said flap member selectively opens to allow access to a cavity entirety recessed within said housing a predetermined depth, at least one document housed entirely within said cavity, said flap being partially received within said cavity when said at least one document is secured therein, said cavity being rectangular and extending horizontally and partially across the length of said housing, said housing includes a vital health information display element that displays vital health information collected from at least one sensor mounted on a steering wheel within a vehicle interior, said vital health information is communicated from said at least one sensor to said vital health information display element using a control element mounted to said steering wheel, said flap is parallel with said vital health information display element when said flap is in a closed position, said vital health information display element is retracted into a slot located between said first portion and said second portion of said housing, said slot carved a predetermined depth within said housing, said slot extending across entirely along the length of said housing, said vital health display element extending vertically and outwardly from said slot, said vital health information display element extending partially along the length of said housing, said vital health display element being entirely above said slot when extended outwardly; and
said housing having a top edge, said vital health information display element extending entirely above said top edge when extended, said flap element being entirely below said vital health information display element when said vital health information display element is in the extended position.

2. The automated retractable information display device of claim 1, wherein a set of fastening members are configured to mount said automated retractable information display device detachably on said vehicle.

3. The automated retractable information display device of claim 1, wherein said second portion has a support area configured to support said extended out said vital health information display element, said support entirely extending across said slot, said support having a height and width greater than said vital health information display element, said vital health information display element extending along a lower side of said support.

4. The automated retractable information display device of claim 1, wherein said at least one sensor is configured to detect grasping on said control element within a defined proximity distance of said automated retractable information display device.

5. The automated retractable information display device of claim 4, further including a rechargeable battery configured to supply power to an actuating element, said transceiver, and said at least one sensor, said actuating element being below said slot, said actuating element being vertical on said lateral side of said housing.

6. The automated retractable information display device of claim 1, wherein said communication network is one of a long-distance communication network or a short-distance communication network.

* * * * *